United States Patent [19]
Nishiuchi et al.

[11] Patent Number: 5,291,470
[45] Date of Patent: Mar. 1, 1994

[54] OPTICAL INFORMATION RECORDING METHOD

[75] Inventors: Kenichi Nishiuchi, Moriguchi; Noboru Yamada, Hirakata, both of Japan

[73] Assignee: Matsushita Electric Industrial Co., Ltd., Osaka, Japan

[21] Appl. No.: 477,199

[22] Filed: Feb. 6, 1990

Related U.S. Application Data

[63] Continuation-in-part of Ser. No. 311,632, Feb. 16, 1989, abandoned.

[30] Foreign Application Priority Data

Mar. 28, 1988 [JP] Japan .................. 63-73610
Mar. 31, 1988 [JP] Japan .................. 63-80839

[51] Int. Cl.$^5$ .............................. G11D 7/00
[52] U.S. Cl. ...................... 369/100; 369/57; 369/116; 369/124
[58] Field of Search ............ 369/59, 100, 109, 111, 369/116, 121, 122, 124, 275.2, 13; 360/59, 114, 46

[56] References Cited

U.S. PATENT DOCUMENTS

| | | | |
|---|---|---|---|
| 4,646,103 | 2/1987 | Sugiyama et al. | 346/1.1 |
| 4,894,816 | 1/1990 | Sukeda et al. | 369/54 |
| 4,939,717 | 7/1990 | Ohno et al. | 369/116 |
| 5,123,007 | 6/1992 | Miyauchi et al. | 369/100 |

FOREIGN PATENT DOCUMENTS

| | | |
|---|---|---|
| 0218243A2 | 4/1987 | European Pat. Off. . |
| 0265971A1 | 6/1988 | European Pat. Off. . |
| 0294932 | 12/1988 | European Pat. Off. .......... 369/275.2 |
| 0347801 | 12/1989 | European Pat. Off. .......... 369/275.2 |
| 62-259229 | 11/1987 | Japan . |
| 0119941 | 5/1989 | Japan .................. 369/100 |

OTHER PUBLICATIONS

"In-Se Based Phase Change Reversible Optical Recording Film"; Motoyasu Terao et al.; SPIE vol. 695 Optical Mass Data Storage II (1986): pp. 105-109.
JSAP Catalog Number: AP 881117-03, pp. 869-870 (Japanese Abstracts 5p-ZD-4—5p-ZD-6, published Oct. 4-7, 1988.
"Optical Data Storage"; 1989 Technical Digest Series vol. 1; published Jan. 17-19, 1989; pp. 6-13.
"Recent Advances in Erasable Phase-Change Optical Disks", Akahira et al., SPIE vol. 899 Optical Storage Technology and Applications (1988) pp. 188-195.

Primary Examiner—Tommy P. Chin
Assistant Examiner—Robert Chevalier
Attorney, Agent, or Firm—Wenderoth, Lind & Ponack

[57] ABSTRACT

In a method of recording an information signal by using a single light beam on a recording medium which is changeable between first and second states which are optically distinguishable from each other, record marks are formed each by the application of the light beam for a predetermined duration to cause the recording medium to melt and thereby result in the first state. The light beam is applied to an area between the record marks after having been modified to have a reduced energy so as to cause the area to melt and result in a state substantially identical to the second state, whereby the record marks can be read highly reliably. In another aspect, each record mark is formed in a symmetrical shape by the application of a train of light pulses providing an energy level which is gradually reduced from the beginning to the ending of the predetermined pulse train duration.

30 Claims, 15 Drawing Sheets

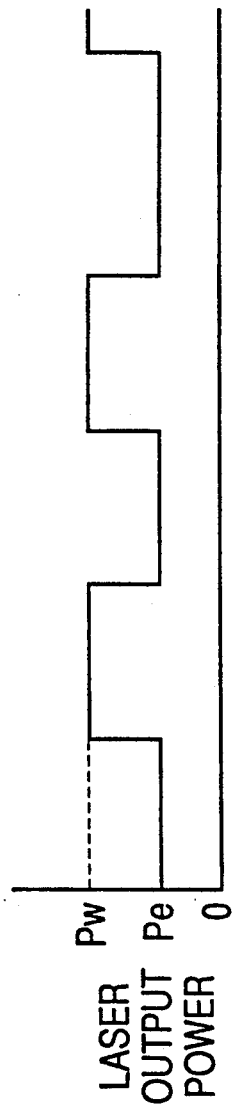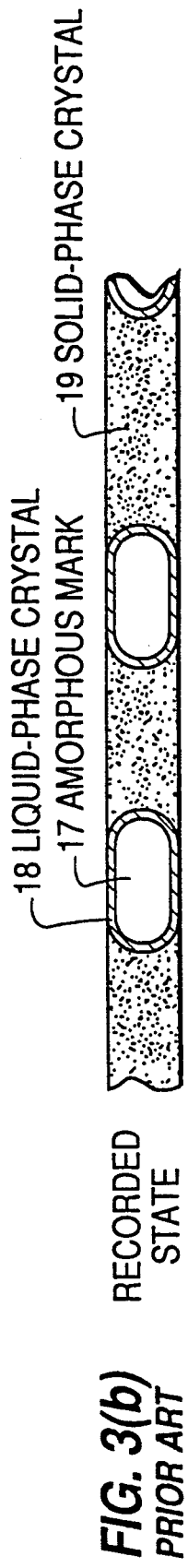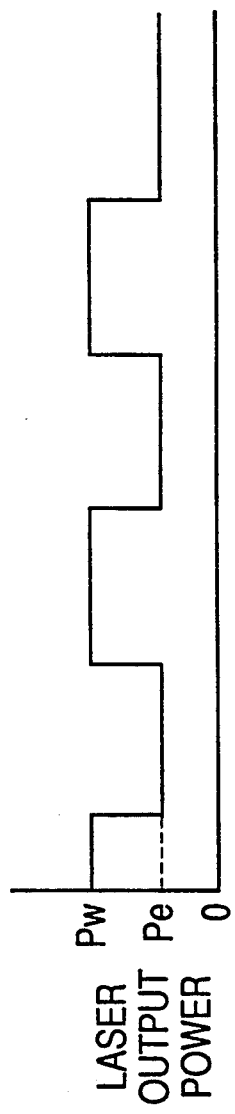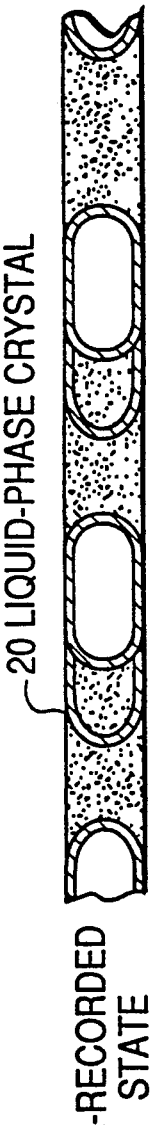
FIG. 3(a) PRIOR ART
FIG. 3(b) PRIOR ART
FIG. 3(c) PRIOR ART
FIG. 3(d) PRIOR ART

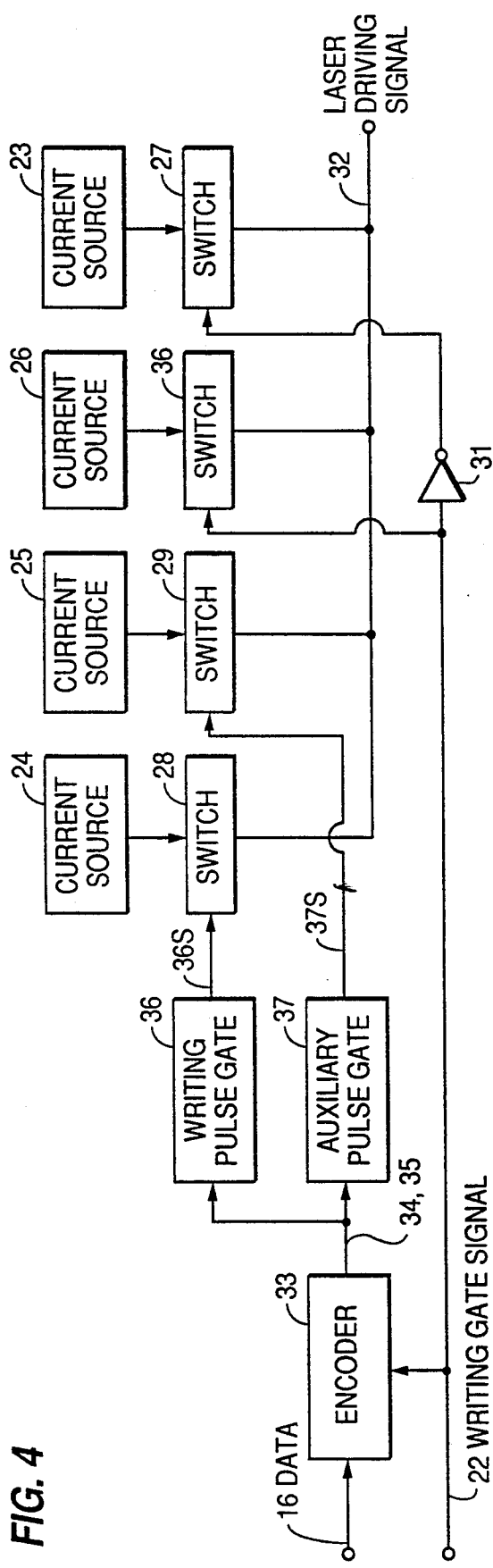

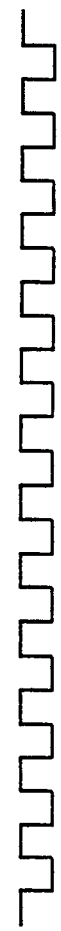
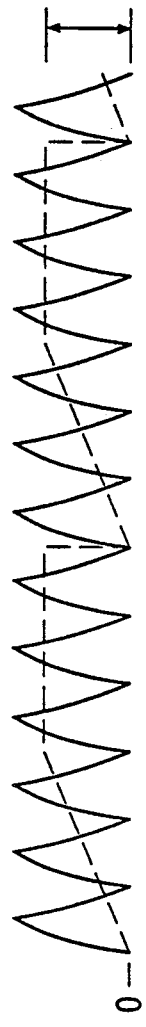
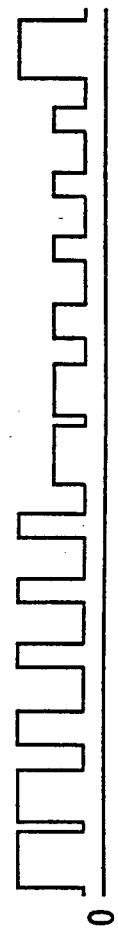
FIG. 14(35)
FIG. 14(34)
FIG. 14(63S)
FIG. 14(70S)
FIG. 14(66S,72S)
FIG. 14(68S)
FIG. 14(36S)
FIG. 14(32S)
FIG. 14(32)

OPTICAL INFORMATION RECORDING METHOD

This application is a continuation-in-part of now abandoned application, Ser. No. 07/311,632 filed on Feb. 16, 1989.

BACKGROUND OF THE INVENTION:

1) Field of the Invention

This invention relates to a method of recording an information signal on an optical information recording medium by irradiating high density energy flux thereon.

2) Description of the Prior Art

Technology that an information signal is recorded and reproduced by using a laser beam is well known and there is an increasingly active trend recently to use it for document and data filing applications. In addition, examples of the research and development on the rewritable recording systems having a erasing function have been reported. Out of them, a phase difference type optical disk is one method available in which the state change either between an amorphous state and a crystalline state or between two different crystalline states is used. Thin recording film to be used in this method features the fact that either an amorphous state or a crystalline state is formed in accordance with temperature rising and cooling conditions when a laser beam is irradiated and that these states are reversibly changeable.

The amorphous state and the crystalline state are different from each other in the complex index of refraction, which can be expressed by refractive index n and extinction coefficient k, and the signal recording is achieved using the thus generated difference in transmittance and reflectance of a recording medium. In order to realize this, when referred to, for example, SPIE's 30th Annual International Technical Symposium on Optical and Engineering, Conference 695: Optical Mass Data Storage 2,695-17, August, 1986, a method has been proposed in which a laser beam modulated between two power levels of writing power Pw and erasing power Pe (Pw>Pe) is irradiated on a recording medium. When a laser beam with its strength modulated according to a signal to be recorded is radiated on the recording medium, a portion where the writing power Pw was irradiated becomes an amorphous state and a portion where the erasing power Pe was irradiated becomes a crystalline state no matter whether the state of an area to be irradiated thereon had been the amorphous or crystalline state before irradiation. As a result, writing and erasing are simultaneously carried out with a single laser beam, which means that an overwrite is carried out.

In the above, we described the change in state between the amorphous state and crystalline state, but when the change in state is between two different crystalline states, the same result as above can be obtained by corresponding the above-mentioned amorphous state to a second crystalline state.

As described above, writing on an optical disk is possible by irradiating a laser beam which has been modulated between two power levels. However, if a signal is reproduced after the overwrite has been repeatedly carried out, a component of the previous signal is superimposed upon the read signal due to incomplete erasures. Such superimposed signal would cause an error when the read signal is demodulated thereafter.

In addition, through detailed observation of the shape of a recording mark formed by the above-mentioned method, it was found that the mark thus formed is not symmetrical in shape at the beginning point and finishing point of writing and the read signal has a waveform distortion corresponding to the asymmetrical shape of the mark.

For this reason, when a recording method that one to closely determine both the rise position and the fall position of a reproduced signal waveform, such as, for example, the pulse width modulation (PWM) method, is to be introduced in order to improve the recording density of an optical disk, the above-mentioned conventional recording method cannot be used.

SUMMARY OF THE INVENTION

A first object of this invention is to provide a method of realizing a high erasability when a signal is to be overwritten on a recording medium using a single laser beam.

A second object of this invention is to provide a recording method which makes it possible to provide a reproduced signal with less waveform distortion.

In one aspect of the present invention, a light beam for forming record marks on a recording medium is applied also, after having been modified to have a reduced energy, to an area between the record marks to cause the recording medium at the area to melt but not change to a record mark forming state. That is, in a method of recording an information signal on a recording medium which is changeable between a first state (written or recorded state) and a second state (non-recorded or erased state) which are optically distinguishable (or which are different in optical properties) from each other by application of a reading light beam, record marks are formed each by application of a writing light beam to the recording medium for a predetermined duration to cause the recording medium to melt at a portion applied with the writing light beam and become, after cooled, the first state. To an area between the record marks is applied a light beam which is the writing light beam having been modified to have a reduced energy to cause the area to melt and become a state which is substantially identical to the second state. As the result, the area of the recording medium beside the record mark formed portions becomes uniformly the state identical to the erased state. This ensures the reliability of the information signal recorded on the recording medium.

The light beam applied to the area between the record marks may preferably consist of a train of auxiliary light pulses each having a pulse width smaller than the predetermined duration of the writing laser beam. However, the modification of the light beam may be such that the peak power level is reduced. It is the only requirement for the light beam applied to the area between the record marks to have an energy which does not cause the recording medium to change its state to the first state.

In another aspect of the present invention, the light beam for forming a record mark is modified to reduce its energy gradually with time, thereby forming the record mark in a symmetrical shape. The modification may be such that the light beam is divided time-divisionally into a train of a plurality of light pulses and the pulse width is gradually decreased or the pulse interval is gradually increased or both. Alternatively, the peak power level of the light beam may be gradually decreased.

The above and other objects, features and advantages of the invention will be more apparent from the following detailed description taken in connection with the accompanying drawings in which:

BRIEF DESCRIPTION OF THE DRAWINGS

FIGS. 3 (a)–(d) are conceptional diagrams showing a modulated waveform of a laser beam and a written state formed thereby in accordance with the prior art;

FIG. 4 is a block diagram showing an example of a laser driving circuit of this invention;

FIG. 6(35)–6(32) together form a timing chart of the gate circuit shown in FIG. 5;

FIGS. 14(35)–14(32 together form a timing chart of the gate circuit shown in FIG. 13;

DESCRIPTION OF THE PREFERRED EMBODIMENTS

Figure 1A:
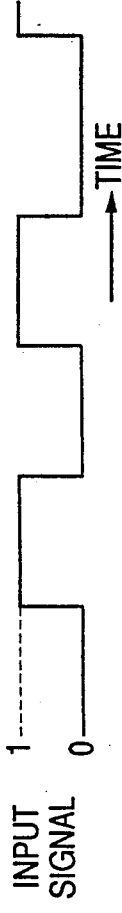
FIGS. 1 (a)–(d) are fundamental diagrams showing a modulated waveform of a laser beam and a written state forming thereby according to a embodiment of this invention.
Figure 1B:
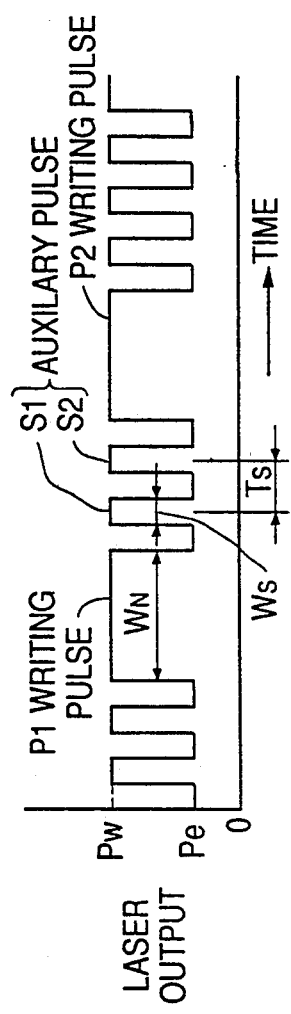
Figure 1C:
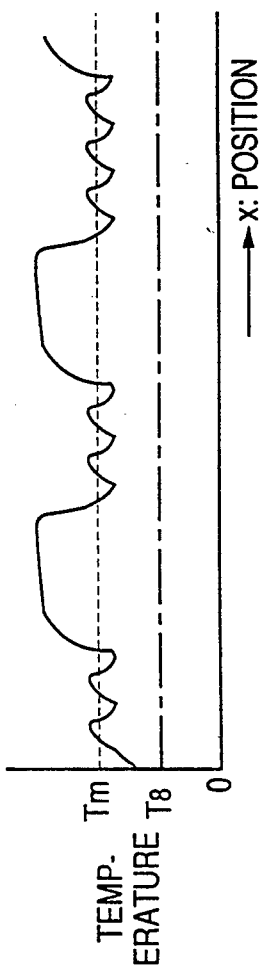
Figure 1D:
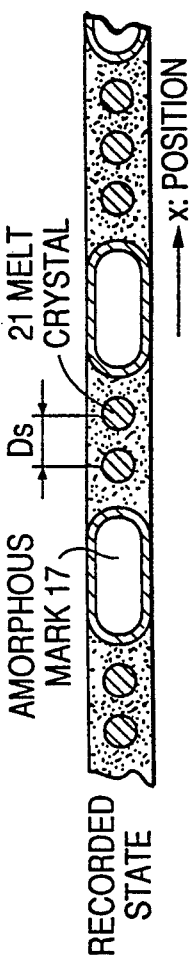

This invention will be described in detail while referring to the drawings.

Figure 2:
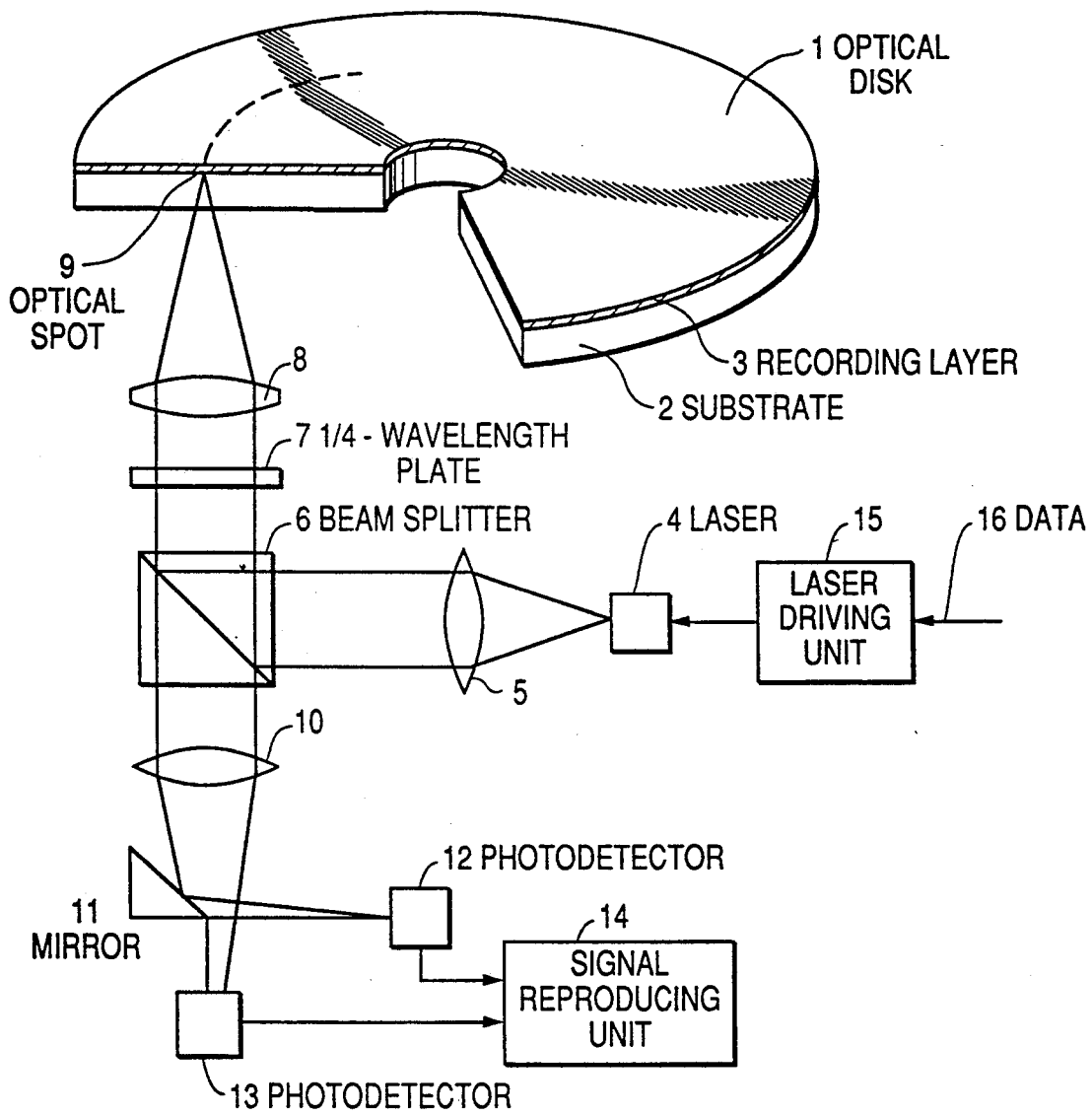
FIG. 2 is a block diagram of an optical recording system in accordance with this invention.

FIG. 2 shows an optical disk and an optical recording system in accordance with one embodiment of this invention.

Optical disc 1 is fundamentally made of a substrate 2 and a recording layer 3 disposed on the substrate 2. As the substrate 2, either resins such as, for example, polymethylmethacrylate (PMMA) and polycarbonate (PC), or glass can be used.

For the recording layer 3 on which a signal is recorded using a phase change by beam irradiation, GeTe, $GeSb_2Te_4$, $Ge2Sb_2Te_5$, InSe system, InSeTlCo system, GeSnTeAn system, SeSbTeSe system, SeSnTeO system, SeTeS system or the like can be used when the phase change is between an amorphous state and a crystalline state, and InSb system, AgZn system or the like can be used when the phase change is between two crystalline states.

Recording on the recording layer 3 (hereinafter used as including the meaning of overwriting) is generally carried out by using, as a laser beam source, a semiconductor laser 4 with a wavelength of 780 nm. A light beam from the semiconductor laser 4 is made parallel by a collimator lens 5, reflected by a polarizing beam splitter 6, passed through a quarter wavelength plate 7, and finally focused by an objective lens 8 to form a circular spot 9 of approximately 1 $\mu$m in diameter, which is a limit on wavelength, on the recording layer 3 of the optical disk 1.

The light beam reflected by the recording layer 3 passes again through the objective lens 8, the quarter wavelength plate 7, the polarizing beam splitter 6 and a lens 10 in this order. A part of the light beam thus reflected and passed therethrough is reflected by a mirror 11 to condense onto a photodetector 12 thereby being used for focus control in a signal reproducing circuit 14. The rest of the light beam is received by a photodetector 13 thereby to be used for tracking control and signal reproduction in the signal reproducing circuit 14.

In addition, the writing is carried out by modulating the power of the semiconductor laser 4 using a laser driving circuit 15 according to a data 16.

EXAMPLE 1

Writing was carried out on an optical disk 1 using a recording method of the prior art. The output of a laser beam used in this case and observations of how the writing was achieved using a transmission electron microscope are shown in FIGS. 3 (a)–3 (d). FIGS. 3 (a) and 3(c) each shows the change of the output power level of a laser beam, in which, FIG. 3 (a) shows the beam used for the first time recording and FIG. 3 (c) shows the beam used for the second time recording.

The output power level thereof changes between a writing power Pw and an erasing power Pe according to the input signal. Observation results of recorded areas are illustrated in FIG. 3 (b) and 3 (d) corresponding to the beam irradiation as patterned in FIGS. 3 (a) and 3 (c), respectively. Also, for the reason that no examination was given upon the shape of a recording mark, the mark is approximated to be symmetrical in shape. In the first time recording of FIG. 3 (b), an amorphous mark 17 was formed where the writing power Pw was irradiated, and a large crystal grain 18 was observed surrounding the amorphous mark 17. Also, where the erasing power Pe was irradiated, a small crystal grain (microcrystal) 19 was observed.

In the second time recording of FIG. 3 (d), a large crystal grain 20, which had been developed in the first time recording, was observed within a small crystal grain obtained when the erasing power Pe was irradiated. From this result, it is considered that the large crystal grain 18 grown surrounding the amorphous mark 17 is a crystal which was produced during cooling from the melt state, and the small crystal grain 19 is a crystal which was precipitately formed from the solid phase state.

Here, the microcrystal which is precipitately crystallized from the solid phase state is defined as "solid-phase crystal", and the crystal which is formed in the cooling process from the melt state is defined as "melt-phase crystal".

These crystal states, having different grain sizes, produce different complex indexes of refraction. Therefore, as seen in FIG. 3 (d), if a melt-phase crystal 20 obtained in the first time recording exists out of the periphery of a newly recorded mark, a small amount of change in reflectance will be induced, resulting in a non-erased fraction of a component of the formerly recorded signal remained.

The recording method of an optical information according to this invention restricts the effect of the melt-phase crystal formed surrounding the recording mark as shown above. That is, in order to improve the erasability, an effective modulation is applied to the output waveform of a laser beam to be irradiated onto the optical disk 1. The modulation and its effect will be explained below by referring to FIG. 1. The waveform of a signal to be recorded on an optical disk is shown in FIG. 1 (a), and the waveform of an output beam from a semiconductor laser modulated in strength by the method of this invention is shown in FIG. 1 (b). FIG. 1 (c) shows the temperature change of the recording layer generated when the beam was irradiated. FIG. 1 (d) shows the transmission-type electron microscopic observations of the shape of the recorded mark formed actually on the recording layer.

The output waveform of FIG. 1 (b) of the semiconductor laser is composed of writing pulses ($P_1$ and $P_2$) which correspond to the level "1" of the code signal of FIG. 1 (a) and auxiliary pulses ($S_1$ and $S_2$) which occur between the writing pulses. The pulse width Ws of each auxiliary pulse is made so as to be smaller than the shortest pulse width of pulse widths Ww of the writing pulse.

If such a beam is irradiated on the recording layer, the temperature where irradiation was made is varied as shown in FIG. 1 (c). Namely, an area where the writing pulses $P_1$ and $P_2$ were irradiated is heated to a temperature exceeding the melting point Tm of a material of the recording layer, so that amorphous marks 17 each having a melt-phase crystal surrounding thereto are formed corresponding to the input signal.

Area where the auxiliary pulses $S_1$ and $S_2$, were irradiated also has the central portion raised in temperature thereby exceeding the Tm to melt. However, because the irradiation time of the beam is short, the temperature rise is restricted to be smaller than that of the writing pulse irradiated area as thus cooled soon. As a result, since such a melt can not cause a cooling condition to make it amorphous, crystallization takes place, to form a melt-phase crystal 21. In addition, the crystallization is made in such a way that the central portion thereof surrounds small amorphous areas. Therefore, almost all of the area between the recorded marks are passed through the melt state. The area passed through the melt becomes the completely random state, so that the history of a previously written signal can be eliminated.

FIG. 4 shows a laser driving circuit for the recording method of this invention. This circuit comprises four kinds of current sources according to the modulation power level of the laser beam. Current sources 23, 24, 25 and 26 correspond to the reading power, peak power of the writing pulse, peak power of the auxiliary pulse and the erasing power, respectively. Each power level can be set to a desired value by varying the current of a corresponding current source. Each current source becomes a laser driving output through respective switching circuits 27, 28, 29 and 30.

In the reading made, since a writing gate signal 22 is turned "OFF", only the switching circuit 27 is turned "ON" by being inverted through an inverter 31, so that a current corresponding to the reading power is outputted as a laser driving output 32.

In the writing mode, the writing gate signal 22 is turned "ON", and the switching circuit 27 is turned "OFF", so that no flow of a reading current results. On the other hand, the switching circuit 30 is turned "ON", and a current corresponding to the erasing power Pe is outputted. In addition, a data 16 is coded by an encoder 33 to output a code signal 34. This coding can be made in any modulation form, for example, FM code, MFM code, 2-7 code, 8-14 code or the like. Also, from the encoder 33, a clock signal 35 is simultaneously outputted together with the code signal 34. These signals thus outputted are passed through a writing pulse gate 36 and an auxiliary pulse gate 37 thereby to be outputted as a writing pulse gate signal 36 S and as an auxiliary pulse gate signal 37 S, respectively. These signals 36 S and 37 S are to switch the current source 24 for the writing pulse and the current source 25 for the auxiliary pulse, respectively. As a result, the combined current of the current sources 24, 25 and 26 is outputted as the laser driving output 32.

Figure 5:
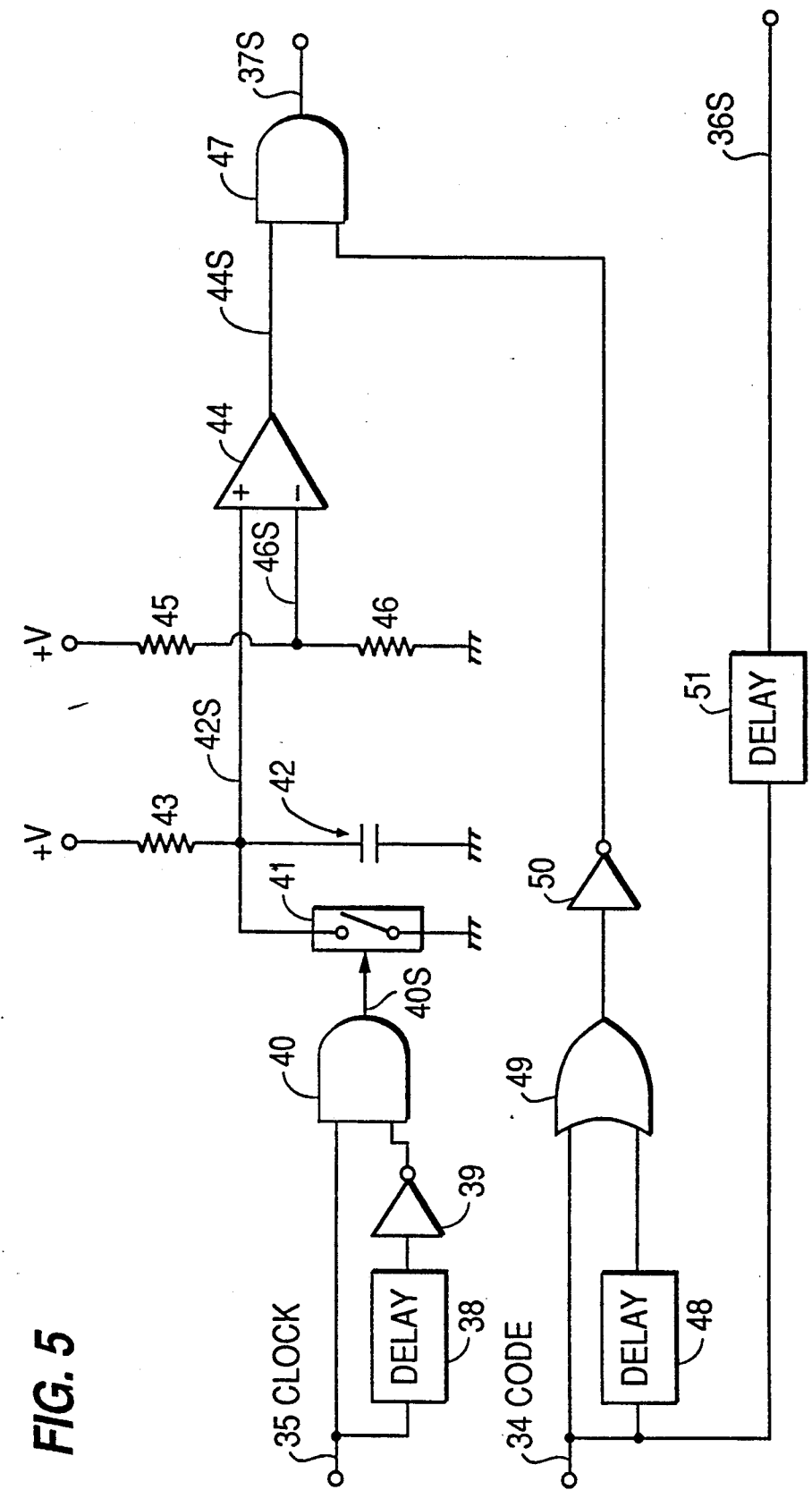
FIG. 5 shows a gate circuit in accordance with a first embodiment of this invention.

Here, a concrete example showing the writing pulse gate 36 and auxiliary pulse gate 37 is shown in FIG. 5 and their timing charts are shown in FIGS. 6(31–6(32). As the input signal, the code signal 34 generated by the encoder 33 and a clock signal generated in the encoding process, particularly the clock signal 35 of higher order are used. The clock signal 35 becomes a leading edge signal 40 S of the clock by a delay element 38, an inverter 39 and an AND gate 40. Capacitor 42 is charged by a current which is supplied from a power source "+V" and passed through a resistor 43, and discharged by driving a switching circuit 41 by the clock signal 40 S, thus a signal 42 S being outputted. Comparator 44 compares a potential signal 46 S obtained by dividing a potential "+V" into a ratio of resistors 45 and 46 with the signal 42S thus outputted thereby to produce a signal 44 S. The signal 44 S is outputted to an AND gate 47. On the other hand, the code signal 34 becomes a signal 50 S for determining the time period during which the auxiliary pulse is generated by a delay element 48, an OR circuit 49 and an inverter 50 to be inputted to the AND gate 47. The auxiliary pulse gate signal 37S is outputted from the AND gate 47. Also, the code signal 34 becomes the writing gate pulse signal 36 S through a delay element 51.

As a result, in the recording mode, the switching circuits 28, 29 and 30 are operated by the writing gate signal 22, writing pulse gate signal 36 S and auxiliary pulse gate signal 37 S, respectively, to produce the laser driving signal 32.

Next, an example of this invention will be described in detail.

An optical disk 1, which comprises a substrate 2 of polycarbonate and a recording layer 3 of $Ge_2Sb_2Te_5$ which has thermal diffusion layers of Zn S disposed on both sides thereof, was rotated at a linear velocity of 15 m/s so as to carry out a writing. Writing and erasing characteristics were analyzed in such a way that, using two frequencies, 2.5 MHz and 2.14 MHz, a signal of 2.5 MHz was recorded first and C/N (carrier - to - noise ratio) value was measured, and then, a signal of 2.14 MHz was written and the C (carrier) component of the 2.5 MHz signal which had been written in advance was measured. The difference of the C component thus measured from the initial value was defined as erasability.

Figure 7A:
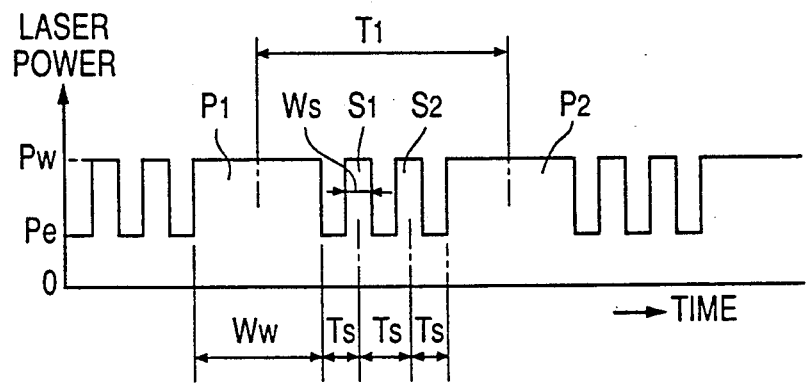
FIGS. 7 (a)–7 (b) are waveform diagrams of a modulated waveform of a laser beam.
Figure 7B:
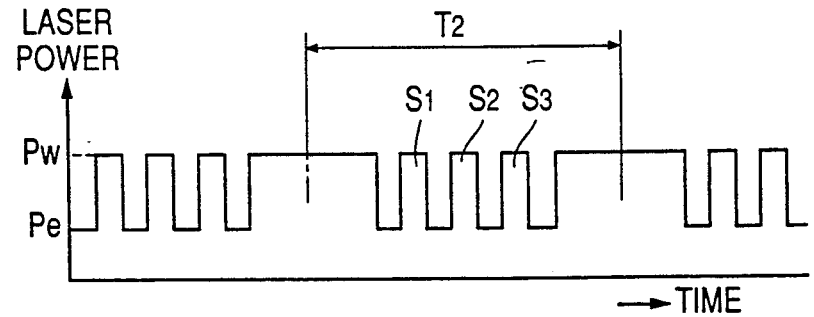

The modulated waveform of the laser beam used for writing will be explained in detail by referring to FIGS. 7 (a)–7 (b). The pulse width Ww of each of the writing pulses $P_1$ and $P_2$ for forming recording marks was 200 nS, and the periods $T_1$ and $T_2$ between the writing pulses $P_1$ and $P_2$ were 400 nS and 467 nS from the above-mentioned condition, respectively. In addition, auxiliary pulses $S_1$, $S_2$ and $S_3$ were arranged at equal intervals of Ts between the writing pulses (Ts=67 nS). Also, the power of each pulse was such that the writing power level Pw was 16 mW, erasing power level Pe was 6 mW, and the peak power of the auxiliary pulse was identical to that of the writing power level.

Figure 8:
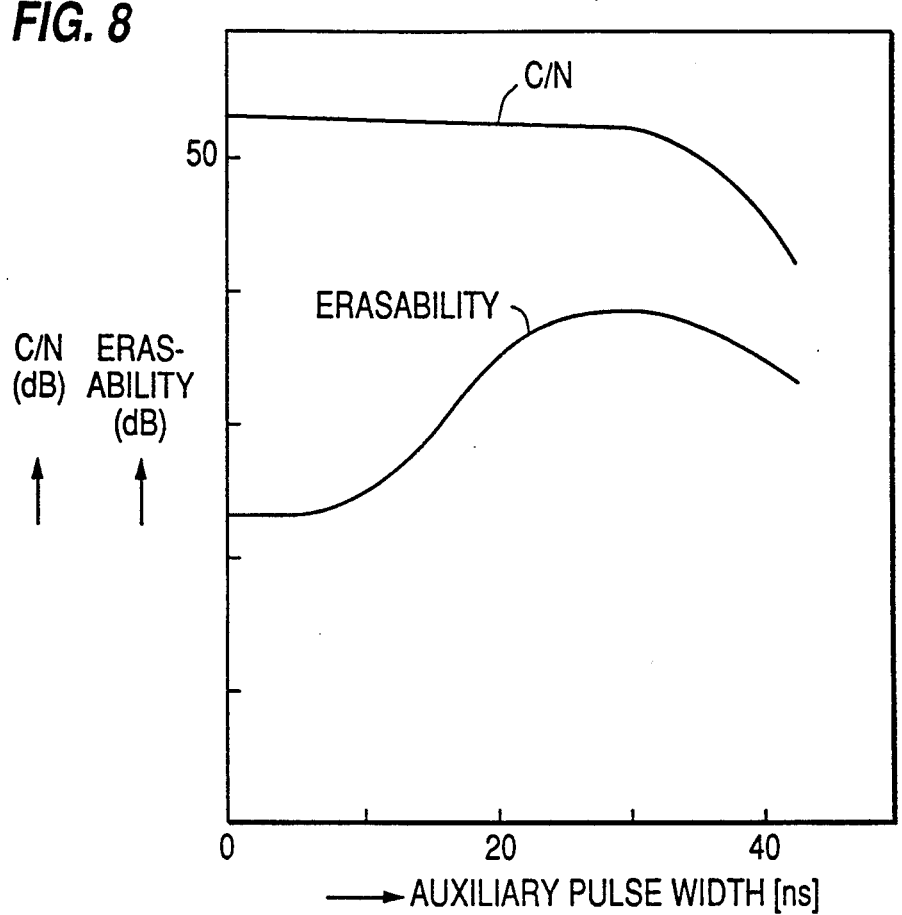
FIG. 8 is a characteristic diagram showing a relationship between the pulse width of an auxiliary pulse and the erasability.

The results of the dependence of the auxiliary pulse on the pulse width and the erasability were shown in FIG. 8. The pulsewidth Ws of the auxiliary pulse can be set arbitrarily by changing either the capacity of the capacitor 42 or the value of the resistor 43 in FIG. 5.

The case where the pulsewidth Ws of the supplementary pulse is 0 nS corresponds to the erasing according to the prior art, in which erasability is smaller such as to be 23 dB. However, as the pulsewidth Ws is increased, the erasability is improved, particularly in the range of 20 to 40 nS, where it exceeds 35 dB. This is due to the fact that the area where the auxiliary pulse was irradiated was melted once and then crystallized.

In addition, when the pulse width is further increased to the range of exceeding 40 nS, erasability decreases. This is because the area where the auxiliary pulse was irradiated is further increased in temperature, so that such an area that once melted has the central portion formed the amorphoue state and the peripheral portion formed the crystal state after cooling. As a result, the change in reflectance when a signal was reproduced is decreased in amount, and the C/N value of the writing state is decreased. Also, small-sized amorphous marks formed by the auxiliary pulse had a mark pitch of 1 μm which is near the signal detection limit of a wavelength of 780 nm of the reading beam, so that detection was impossible for the change of read signal.

Figure 9:
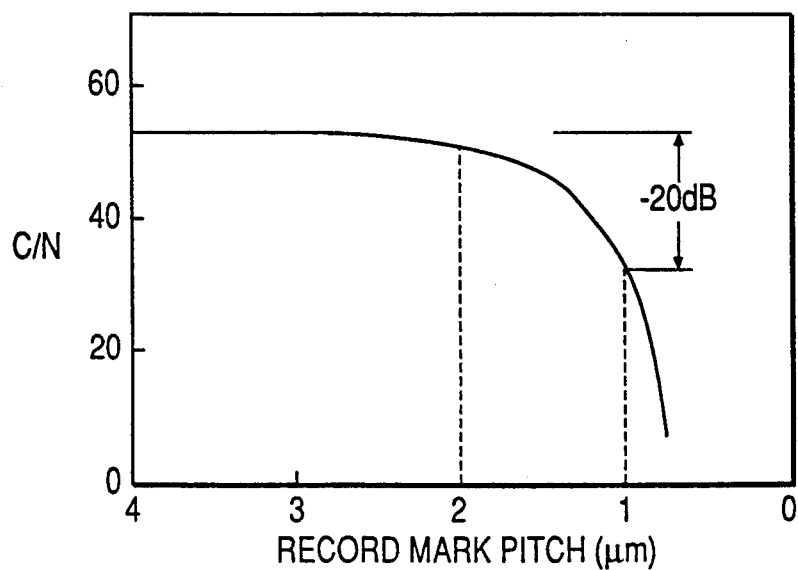
FIG. 9 is a characteristic diagram showing a relationship between the pitch of a recording mark and the reproduced signal.

In order to clarify the condition under which either the melt-phase crystal or small-sized amorphous mark formed by the auxiliary pulse gives no effect on the read signal, the relationship between the pitch of recorded marks formed on the optical disk and the read signal was analyzed, which is shown in FIG. 9.

The modulated waveform of the laser beam was identical to that shown in FIG. 3 (a) and the frequency thereof was varied according to the pitch of the recorded marks. Also, the duty factor of the writing pulse was 50% (the pulse width and pulse interval are equal to each other). When the mark pitch exceeds 3 μm, the C/N remains constant, but when it is below 2 μm, the C/N is decreased gradually, for example, when it is 1 μm, the C/N value decreases 20 dB.

However, the optical microscopic observation revealed that in each case, the recorded mark corresponding to a signal to be written was confirmed to be formed.

From the fact that in this case, the wavelength of a laser beam was 0.78 μm, the ratio of the mark pitch and the wavelength of the reading beam was about 1.2 times, and it was revealed that if the value of this ratio is 1.2 or less, its effect on the read signal can be reflected. In general, the spot diameter obtained when a laser beam is condensed up to the resolution limit can be supposed to be proportional to the wavelength of the laser beam. Here, supposing that a linear velocity of the optical disk is V, a wavelength of a laser beam is L and pulse interval is Ts, the pitch Ds of recorded marks can be expressed as follows:

$$Ds = V/Ts \qquad (1)$$

Also, by applying this expression (1) to the above-mentioned condition (Ds<1.2×L), the required pulse interval Ts can be expressed as follows:

$$Ts < 1.2 \times L/V \qquad (2)$$

The state obtained from such an auxiliary pulse train as to satisfy this expression (2) (melt crystal or melt crystal accompanying with amorphous one) gives no effect on the recorded mark and increases the erasability only.

Based on the result obtained as above, it becomes possible by arranging an auxiliary pulses between the writing pulses to achieve a writing while almost all area of a track is being melted, thus being capable of overwriting a signal with an improved erasability.

In the above description, the peak power level of the auxiliary pulse is identical to the writing power level Pw. But, when the peak power level is made higher than the Pw, the pulse width may be made smaller to effect the erasability improvement. Inversely, when the peak power level is made smaller than the Pw, the required pulsewidth is widened, but when made further smaller, the recording material can not be heated to the melting point even if the required pulsewidth is widened, which means that the effects of this invention can not be obtained.

Based on the comprehensive results of the above description and consideration upon simplification of the driving circuit of a laser beam, to make the peak power level of the auxiliary pulse identical to the writing power level Pw is advantageous because only two power levels of the laser beam are needed. Namely, a single current source can be used in common for producing the writing pulse and auxiliary pulse. pulse of the current source 25 can be used in common.

As another modulation system of a laser beam, by varying the erasing power level Pe, the same experiment as above was carried out. The result was that even when the erasing power level Pe was 0 mW, an erasability of 35 dB or more was obtained under a condition that the pulsewidth Ws of the auxiliary pulse ranged from 30 to 40 nS. With the system, only one power level of the laser beam results, which means that the current source 26 for the erasing power can be eliminated, and thus, the driving circuit of the laser beam can to be further simplified.

EXAMPLE 2

In EXAMPLE 1, modulation of the erasing power was described, but in this EXAMPLE 2, a description follows on a method of further reducing the waveform distortion of a reproduced signal by adding modulation to the writing power.

Waveform distortion is mainly caused by asymmetry of a recorded mark. The phenomenon that the recorded mark becomes asymmetrical is a peculiar one in the heat mode recording. That is, a phase change type recording medium and a optomagnetic recording medium for which the magnetic Kerr effect of a thin ferroelectric film is applied are all such that an absorbed beam is once converted into a heat and a record mark results due to the heat thus converted. As a result, if the balance between the heat generation and its diffusion differs due to the irradiation time of a beam (i.e.—the pulse width), power or the like, the shape of the recorded mark will be distorted.

Figure 10A:
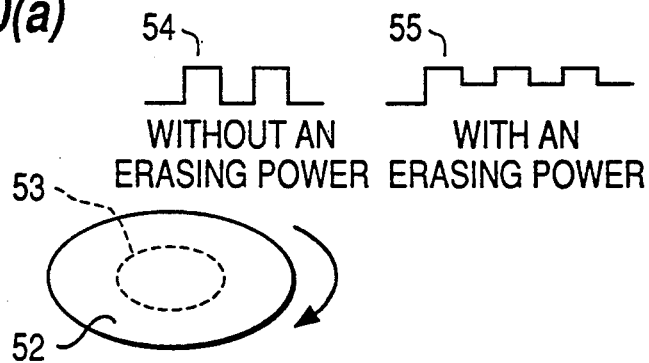
FIGS. 10 (a) and (b) are one model which was used for calculating the temperature change when a beam was irradiated using the conventional overwriting method or recording method and a characteristic diagram obtained based on the calculated result, respectively.
Figure 10B:
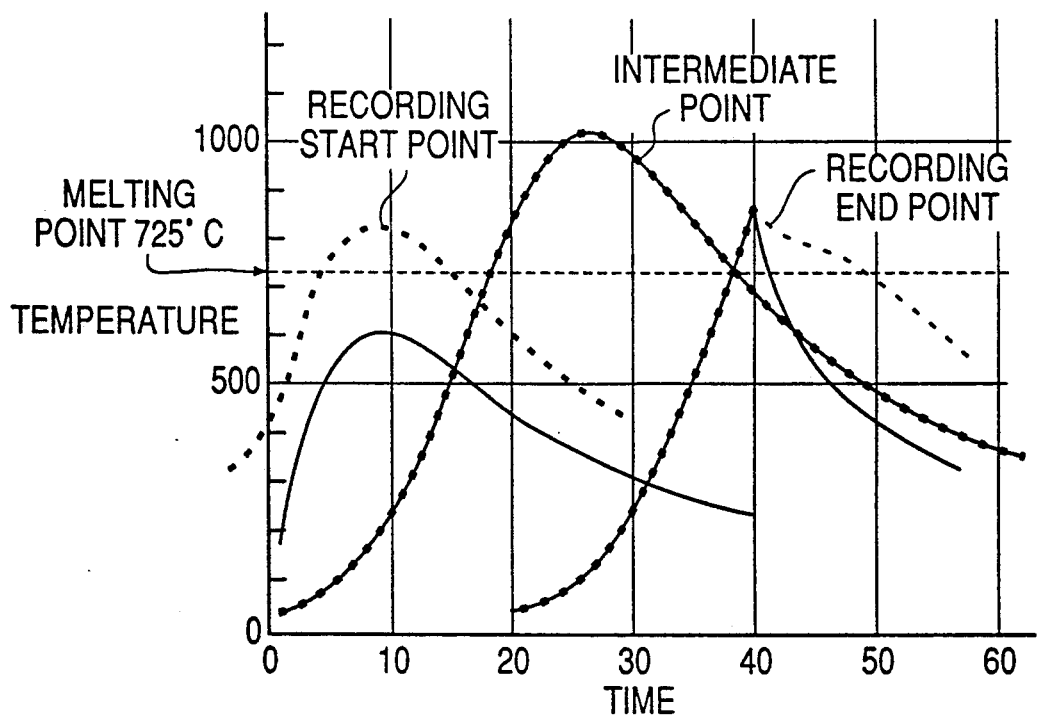

Using a model shown in FIG. 10 (a), dependence of temperature on the time change was determined. In addition, observation of the record mark actually obtained was carried out. The recording medium 52 was structured so as to be generally used in a rewritable type optical disk. A GeTe thin film of 90 nm thickness whose upper and lower surfaces respectively have ZnS thin films of 100 and 200 nm thickness in a sandwich manner was formed on a polycarbonate substrate with a thickness of 2 mm. The same substrate as the above-mentioned one was affixed thereon using an adhesive. The disk thus formed was turned at a linear velocity of 22.5 m/s. A pulse beam 54 (in the case of no including erasing power) or pulse beam 55 (in the case an included erasing power) was irradiated onto a track 53. The writing power to be used was 10 mW. Also, the pulsewidth to be irradiated was 88.8 nS. The recording medium moved a small distance of 2 μm during irradiation of the pulse beam. FIG. 10 (b) shows the calculated result of the temperature change on the center line of the track at each of the beginning point, intermediate point and finishing point of each mark writing. The dotted lines correspond to the case of no included erasing power while the solid lines correspond to the case of an included erasing power.

From this, when the erasing power existed, the following differences were obtained as compared with the case when the erasing power did not exist:

1) The temperature rise at the beginning point of radiation is rapid and reachable temperature is high. As a result, melting takes place not only where the writing power was irradiated but also at a part of the area before the beginning or irradiation of the erasing power only.
2) The cooling rate at the finishing point of irradiation of the writing power is slow, which means that the melting is held for a longer period of time than other areas. As a result, in an area behind the finishing point of irradiation, the melting takes place in a wide area.
3) At the intermediate point of irradiation of the writing power, almost no difference between the temperature rising and lowering profiles results.

As shown above, when the erasing power was added, the recording mark had a shape extended irradiation-wise. If the writing power is decreased in order to solve this problem, the temperature at the central portion will be decreased, so that it is anticipated that the mark width can be reduced.

Figure 11A:
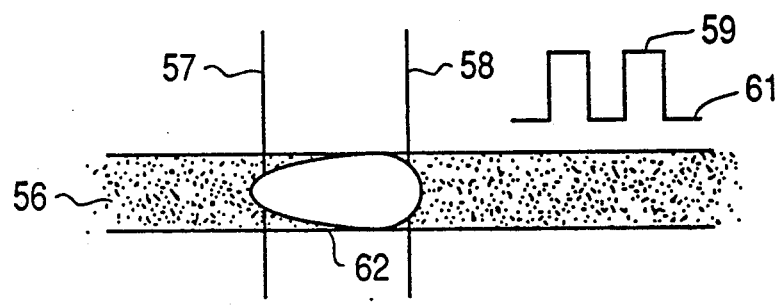
FIGS. 11 (a)–11 (c) show the shape of a recording mark formed when a beam was irradiated using a method of the prior art.
Figure 11B:
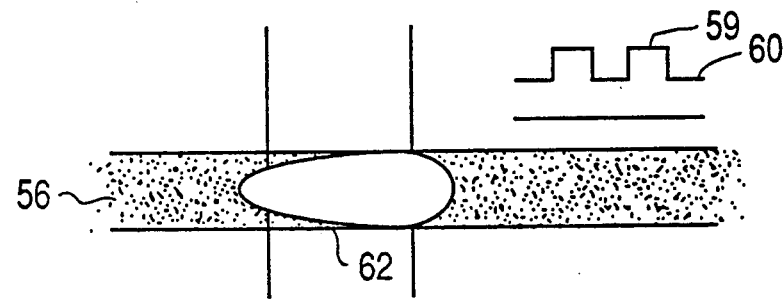
Figure 11C:
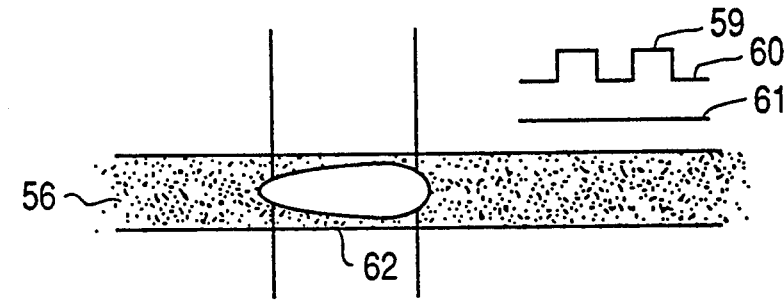

FIGS. 11 (a)-11 (c) the observations using a transmission electron microscope on the shape of a mark 57 written on a guide track 56 of the optical disk. In this case, to emphasize the shape of the record mark, the boundary between the melt-phase crystal and the solid-phase crystal was omitted. FIGS. 11 (a), 11 (b) and 11 (c) are the case where the erasing power does not exist, the case where the writing power is the same as the writing power of 11 (a) and yet the erasing power exists, and the case where the erasing power is the same as the erasing power of 11 (b) and the writing power is decreased, respectively.

Point 57 indicates the point where the laser beam is changed from an erasing power 60 to a writing power 59, and a point 58 is the point where the laser beam is changed from the writing power to the erasing power. When the erasing power was higher than this, the record mark having a shape extended irradiation-wise was formed. Also, when the writing power was lowered, the record mark having a narrow width as a whole was obtained. In addition, in any one of 11 (a), 11 (b) and (c), such a trend that the width of a mark is narrow at the beginning point of writing and wide at the finishing point thereof could be recognized. From the results shown above, it can be said that it is extremely difficult to demodulate a signal written by using a read signal obtained from such a mark since has an error in length and a distortion in shape with no error.

This invention solves the above-mentioned problems by subjecting a density change of high frequency further to an optical energy to be modulated according to an information signal.

Figure 12:
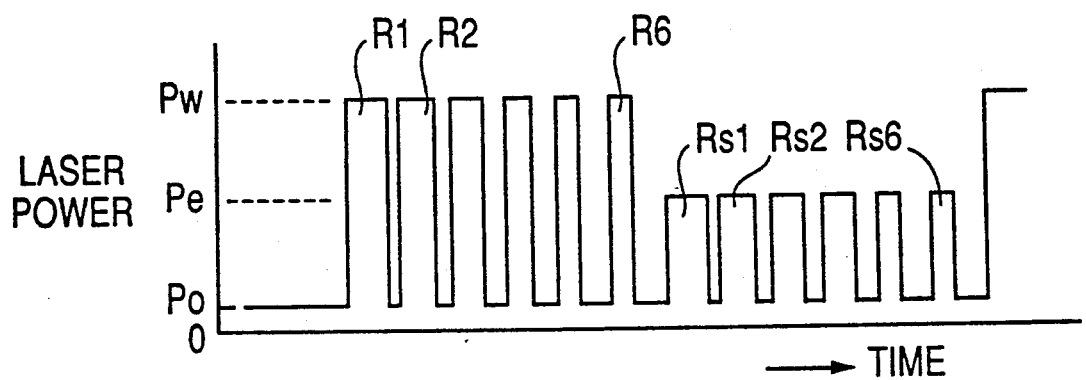
FIG. 12 is a waveform diagram showing a modulated waveform of a laser beam in accordance with a second embodiment of this invention.

FIG. 12 shows an example of a modulated waveform of a beam to be irradiated and its features are discussed below in detail.

1) The laser beam has a pulse modulation between the writing power Pw and the erasing power Pe at a pulse interval $T_3$ corresponding to an information signal to be written.
2) In addition, independently of the information signal, a pulse interval $T_4$ which is suitably smaller than the pulse interval $T_3$ is superimposed thereon. As a result, a beam for forming the record mark is composed of a plurality of auxiliary writing pulses, $R_1$ through $R_6$, which were modulated between the writing power Pw and reading power Po. Also, the beam between one record mark and another recording mark is composed of a plurality of auxiliary pulses, Rs1 through Rs6, which were modulated between the erasing power Pe and reading power Po.
3) The pulse width of the pulse train generated in the period $T_4$ is maximized just after each pulse was switched to the period $T_3$ and then decreased gradually to converge to a specific value. Namely, the pulsewidth is the greatest just after being switched from the auxiliary writing pulse train to the auxiliary pulse train or just after being switched from the auxiliary pulse train to the auxiliary writing pulse train. Conversely, the pulse width is the smallest just before the above-mentioned switching is carried out.

Figure 13:
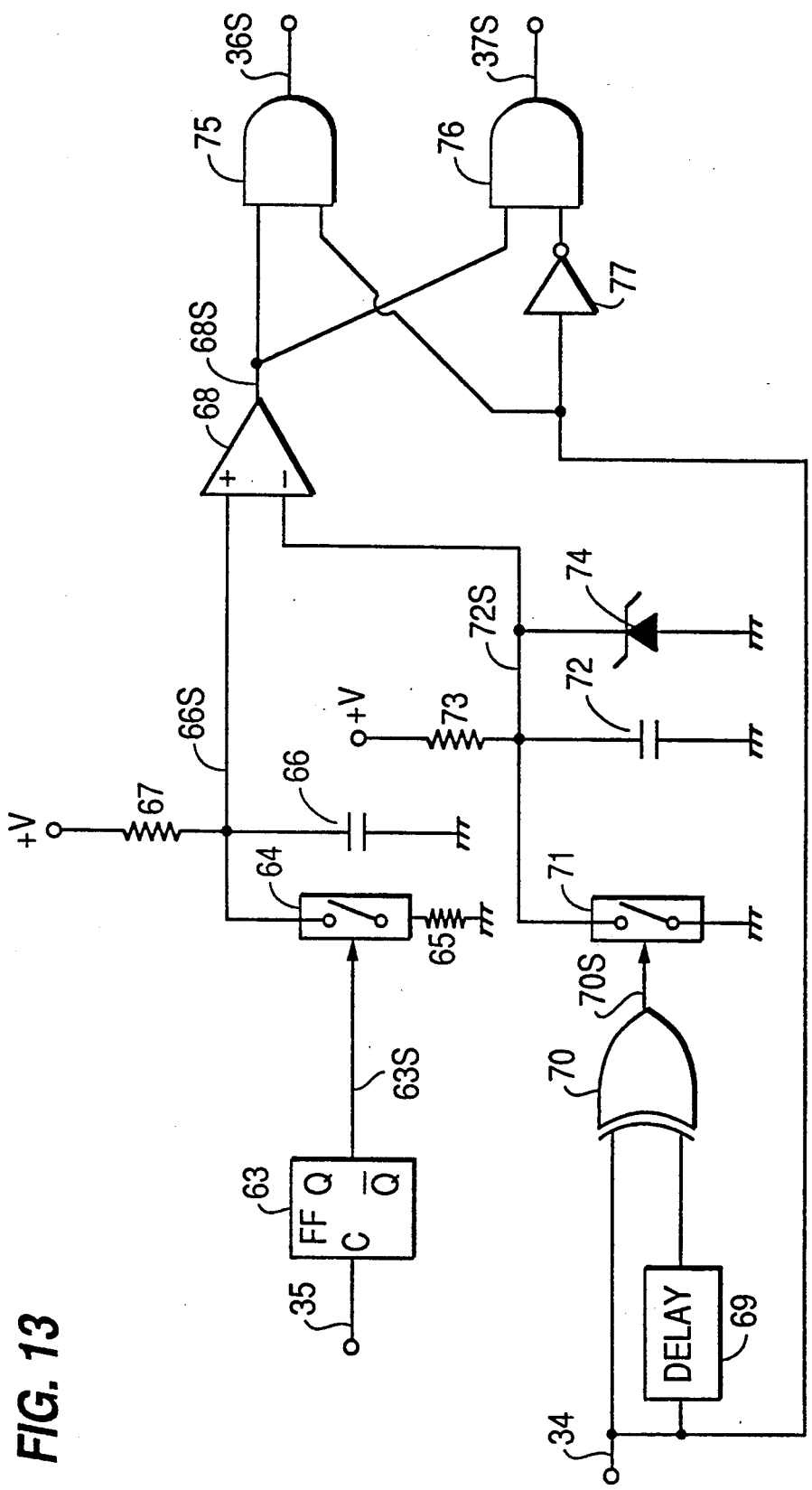
FIG. 13 shows a gate circuit in the second embodiment.

The structure for obtaining the above-mentioned modulated waveform was the same as that in FIG. 4, although the details of the writing pulse gate 36 and auxiliary pulse gate 37 were modified. FIG. 13 shows an example of a circuit structure and FIGS. 14(35)-14(32) form its timing chart. The circuit structure resembles that shown in FIG. 5, and pulses having different pulsewidths are generated using the difference in charging and discharging characteristic of two capacitors 66 and 72. A clock signal 35 of high order drives a switching circuit 64 through a flip-flop 63. Capacitor 66 is charged by a current passed through a resistor 67 from a power source "+V" and discharged through a discharging resistor 65 when the switching circuit 64 was driven. At this time, a potential signal 66S is inputted into a comparator 68.

On the other hand, code signal 34 is similarly passed through a delay element 69 and an exclusive OR gate 70 to output an edge current 73 S of the coded signal used to thereby drive a switching circuit 71. Capacitor 72 is charged through a resistor 73 having a suitably high resistance as compared with the resistor 67 and a potential 72 S is increased up to the rated voltage of a Zener diode 74, thereafter indicating a constant value. Also, when the switching circuit 71 was driven, the capacitor 72 is discharged. The potential signal 72 S of this capacitor 72 is inputted to the comparator 68. From the comparator 68, a signal obtained by comparing the signals thus inputted, 66 S and 72 S, is outputted for inputting to AND gates 75 and 76. In addition, the code signal 34 is inputted to the AND gate 75 or the AND gate 76 through an inverter 77 so as to thereby output a writing pulse gate signal 36 S and a supplementary gate signal 37 S, respectively.

By this method, the length of a record mark can be accurately determined as shown below. Namely, the rise position and fall position during the writing can be precisely determined.

Figure 15:
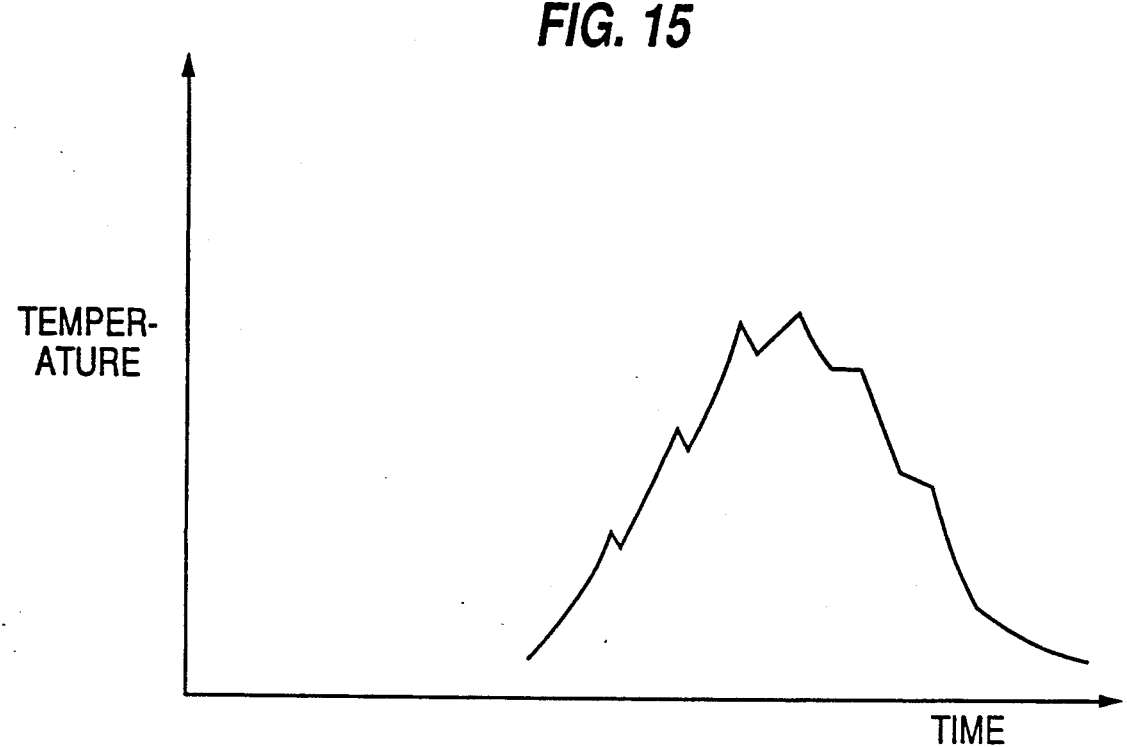
FIG. 15 is a diagram showing a temperature change where irradiation was made when the modulation method of this invention was applied.
Figure 16:
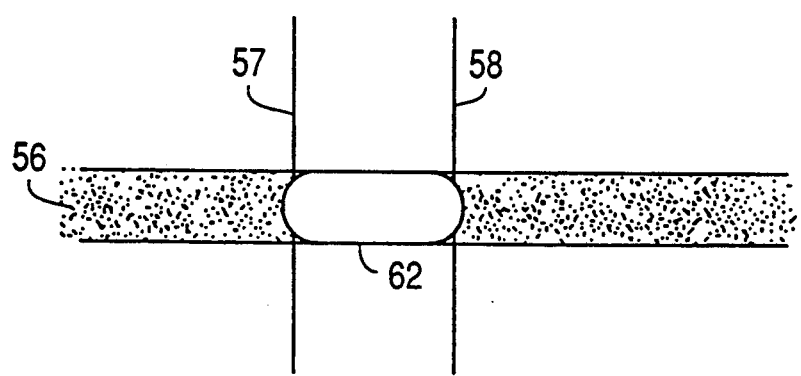
FIG. 16 shows a shape of a recording mark according to this invention.

FIG. 15 shows the temperature change when an overwrite was carried out using the modulated waveform shown in FIG. 12. In this case, the structure of the optical disk is identical to that shown in FIG. 10, and the result shown is the temperature change at the finishing point of writing. The period $T_4$ and the power level Pw were set such as to be 1/6 of $T_3$ and two times of the Pe, respectively. Also, the duty of pulse width was 90%, 80%, 70%, 60%, 60% and 60% in the order from a first pulse. The melting time was shortened as compared with the example shown in FIG. 10, so that it is supposed to be difficult to give an effect up to the rear portion of a recording mark. FIG. 16 shows the observation result of the record mark. The shape of a record mark thus obtained was symmetrical at the beginning point and finishing point of writing and its length was of a specified amount. The temperature rise could be carried out more smoothly when $T_4$ was at value not exceeding one half of $T_3$. In addition, in order to uniformalize the temperature distribution, it is preferable to make each pulse width wide at the initial stage and then narrow in a gradual manner. Provided, if a long mark is to be recorded, the temperature distribution could be more uniformalized when the pulse width was made constant after irradiation of a constant number of pulses.

Figure 18:
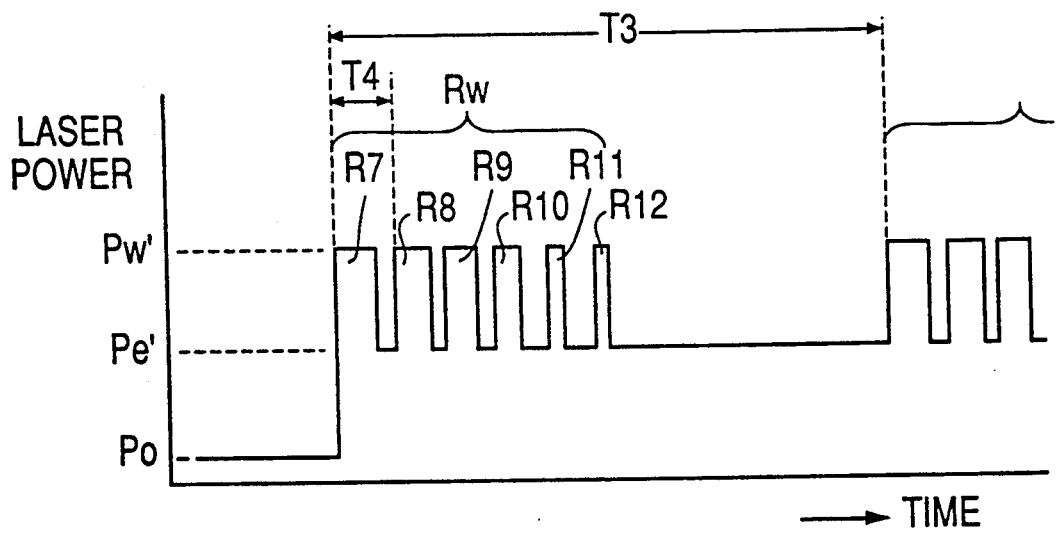
FIG. 18 is a waveform diagram showing a modulated waveform of a laser beam in another embodiment of this invention which is a modification from the second embodiment.

In the method as described above, each of the writing power and the erasing power is modulated by a high frequency pulse signal, or each of the writing light pulse and the erasing light pulse is composed of a plurality of auxiliary light pulses, to obtain a record mark having a symmetric shape. However, when the allowance for the symmetric shape of the record mark is relatively large, or the record mark is not required to have a highly accurate symmetric shape, the above-described method may be modified such that only the writing power is modulated by a high frequency pulse signal and the erasing power is maintained at a constant level. FIG. 18 shows a waveform of a laser beam whose power is modulated in such a modified manner. More specifically, referring to FIG. 18, the laser beam is pulse-modulated between a writing power level Pw' and an erasing power level Pe' at a cycle period of T3 according to an information signal to be recorded to become a writing light pulse Rw at an area where a record mark is to be formed and become a constant power level which is the erasing power level Pe' at an area between record mark formed areas or before and after a record mark formed area. The writing light pulse Rw is further modulated between the writing power level Pw' and the erasing power level Pe' at a constant cycle period of T4 which is adequately shorter than the cycle period of T3. In other words, the writing light pulse is constructed by a plurality of auxiliary light pulses R7 through R12 modulated between the writing power level Pw' and the erasing power level Pe'. The pulse width of the auxiliary light pulses is changed such that it is maximum at the front edge of the writing light pulse for forming a record mark, and decreases gradually to reach a predetermined pulse width (R11). After the predetermined pulse width has been reached, the pulse width of the subsequent auxiliary light pulses (R12) is maintained to be the predetermined pulse width. On the other hand, the erasing power of the laser beam between writing light pulses is maintained at the constant erasing power level Pe' without being modulated by a high frequency auxiliary pulses. The modulated waveform shown in FIG. 18 can be produced by modifying the circuit arrangement shown in FIG. 4 such that, for example, current source 25, switch 29 and auxiliary pulse gate 37 are removed from the circuit shown in FIG. 4 and writing pulse gate 36 is configured as shown in FIG. 13. Accordingly, in this method, the configuration of the laser driving circuit becomes simpler than the method of modulating both the writing power and the erasing power.

As described above, the method represented by the waveform shown in FIG. 18 is basically different from the method represented by the waveform shown in FIG. 12 in that the erasing power of the laser beam is not modulated but maintained at a constant erasing power level. However, there are some other specific differences between the two methods. For example, the optimum pulse widths of the auxiliary pulses are different from each other between the two methods. The ratio of the pulse width of the first occurring auxiliary light pulse (R7) at the front edge of the writing light pulse to the pulse width of the last occurring auxiliary light pulse (R12) at the rear edge of the writing light pulse in the waveform shown in FIG. 18 is made larger than the ratio of the pulse width of the first occurring auxiliary light pulse (R1) at the front edge of the writing light pulse to the pulse width of the last occurring auxiliary light pulse (R6) at the rear edge of the writing light pulse in the waveform shown in FIG. 12, i.e. R1/R6<R7/R12. Further, the ratio of the writing power level Pw' to the erasing power level Pe' (Pw'/Pe') in the waveform shown in FIG. 18 is made larger than the ratio of the writing power level Pw to the erasing power level Pe (Pw/Pe) in the waveform shown in FIG. 12, i.e., Pw'/Pe'>Pw/Pe. In other words, if the writing power level is the same in the two methods (Pw'+Pw), the erasing power level is made lower in the method represented by the waveform shown in FIG. 18 than in the method represented by the waveform shown in FIG. 12, i.e., Pe'<Pe.

In this manner, it is possible by the modified method using a single laser beam having the modulated waveform as shown in FIG. 18 to obtain a similar effect to that obtained by the method using a single laser beam having the modulated waveform as shown in FIG. 12, i.e., to form a record mark having a substantially symmetric shape.

EXAMPLE 3

The method shown in EXAMPLE 2, in which the pulse width of a writing pulse is changed in order, is a useful method for use in optical recording media of not only the rewriting type but also the write-once type. With an optical recording member of such a write-once type, an asymmetrical record mark in shape as shown in FIG. 11 (a) is formed. However, the area equivalent to this record mark may be, based on the recording material and the recording principle, considered to have various cases such as when the change is made from the amorphous state to the crystalline state, when the shape of a recording material is evaporated, or the like. In any case, the same problem must be pointed out in that the record mark width at the beginning point of writing is narrow and that at the finishing point thereof is wide, so that a reproduced waveform will be distorted. In this invention, the beam irradiating condition for forming one record mark is set so that the energy density can be made high at the beginning point of writing and gradually decreased as it moves toward the finishing point thereof.

The modulated waveform in this case can be obtained by omitting parts relating the writing pulses of circuits shown in EXAMPLE 2, for example, the current sources 25 and 26.

Figure 17A:
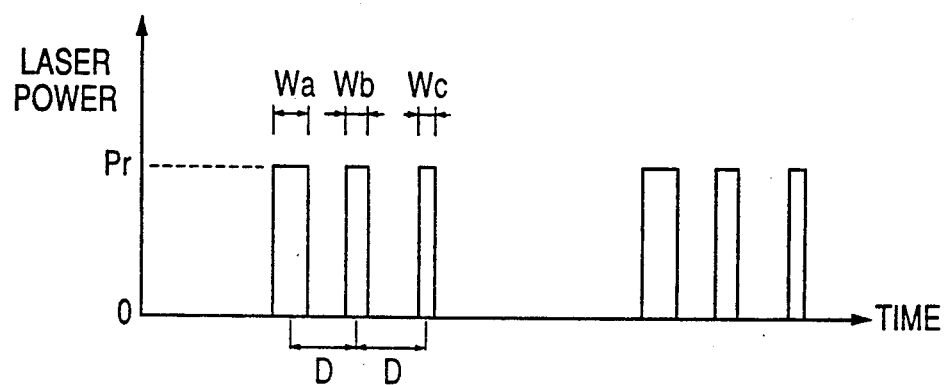
FIGS. 17 (a)–17 (b) are waveform diagrams showing a modulated waveform of a laser beam in a third embodiment of this invention.
Figure 17B:
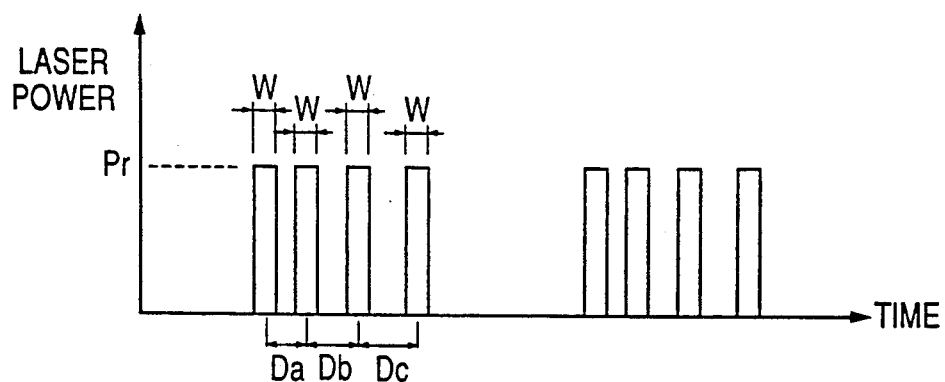

FIGS. 17 (a)-17 (b) waveforms written on a medium of the write-once type. In FIG. 17 (a), setting is made so that a plurality of pulses are prepared with respect to one record mark and further a pulsewidth of these pulses becomes wide at the beginning point of writing and narrow at the finishing point thereof. Here, an optical disk which was made of a polycarbonate substrate 2 and a Te-O-Pd system recording layer 3 was used and the writing was carried out under conditions such as to be rotated at a linear velocity of 3 m/S and irradiated at a frequency of 833 kHz for the comparison purpose of this invention with the prior art. The evaluation of the shape of a record mark was achieved by measuring the spectrum strength of a reproduced signal using a spectrum analyzer. The value of a secondary harmonic distortion (SHD) which is expressed by a ratio of the strength A of a writing signal component (833 KHz) and the strength B of the second high-frequency (1.66 MHz) component was used as a standard.

$$SHD = 20 \log (A/B)$$

In addition, it is indicated that as this value increases, distortion of a reproduced signal becomes small, and that the shape of a record mark becomes symmetrical.

When recorded using a waveform according to the prior art, the optimum peak power was 4.5 mW and the SHD value was 25 dB. On the other hand, when the modulated waveform as shown in FIG. 17 (a) was used under conditions such that the peak power was 8 mW, each pulse space was 300 nS and pulse widths of each pulse, Wa, Wb and Wc, were 180 nS, 150 nS and 140 nS, respectively, the SHD value was 38 dB, which means that the SHD value was increased by 13 dB as compared with the method of the prior art and the record mark is improved in symmetry. By increasing the number of pulses and selecting their pulse width, the SHD value can be further improved.

As another method, the modulated waveform as shown in FIG. 17 (b) is available. Contrary to the case shown in FIG. 17 (a) in which the optical energy is concentrated upon the beginning point of writing of a record mark by changing the pulse width of each pulse, in FIG. 12 (b) the pulse width of one pulse and the peak power are held constant and the pulse interval is subjected to modulation. Namely, by setting the pulse interval Da at the beginning point of writing so as to be smaller than successive pulse intervals Db and Dc, the optical energy is concentrated upon the head portion of a record mark.

Using this method, writing was carried out in the same manner as above. In this case, the writing conditions were such that the peak power was 8 mW, the pulse width was 120 nS and pulse spaces Da, Db and Dc were 150 nS, 200 nS and 250 nS, respectively. The SHD value obtained was 36 dB, being effective to improve the symmetry of the recording mark.

Other than the above-mentioned method, as the method for concentrating the optical energy upon the beginning portion of a record mark, such a method that the pulse interval and pulse width of a plurality of pulses are held constant and the pulse power at the beginning point of writing is set so as to be higher than that of successive pulses is available. In this case, symmetry of a recording mark can be improved.

With the method of this invention, the following effect are obtainable:
a) The erasability ratio can be improved, that is, overwrite with less effects of a previous recording signal is possible when information is to be rewritten; and
b) The symmetry of a record mark can be improved, that is, writing with less distortion of a read signal is possible.

Thus, a recording method of an optical information recording medium adapted to be used in performing high density signal recording can be obtained.

What is claimed is:

1. A method of recording an information signal by using a single light beam on a recording medium which is reversibly changeable between first and second states which are optically distinguishable from each other, comprising the steps of:
applying the single light beam, as a recording light pulse, in response to the information signal to the recording medium for a predetermined duration to cause the recording medium to melt and become the first state thereby forming a record mark; and
modifying the single light beam before and after the recording light pulses into a train of auxiliary light pulses each having a shorter duration than the predetermined duration and applying the train of auxiliary light pulses to an area of the recording medium before and after the record mark to cause the area to melt and become a state substantially identical to the second state.

2. A method as claimed in claim 1, wherein the first state is an amorphous state and the second state is a crystalline state.

3. A method as claimed in claim 1, substantially satisfying the following condition:

$$Ts < 1.2 \times L/V$$

where Ts is an interval of the auxiliary light pulses, L is a wavelength of a reading light beam used for reading the information signal recorded on the recording medium, and V is a relative speed between the recording medium and the reading light beam.

4. A method as claimed in claim 1, wherein a peak power level of each of the auxiliary light pulses is equal to a peak power level of the recording light pulse.

5. A method as claimed in claim 1, wherein the recording light pulse consists of a train of a plurality of auxiliary recording light pulses.

6. A method as claimed in claim 5, wherein a first occurring auxiliary light pulse has a longest duration and a last occurring auxiliary light pulse has a shortest duration in the train of the auxiliary light pulses.

7. A method as claimed in claim 5, wherein the auxiliary light pulses have pulse durations gradually reduced in the train of the auxiliary light pulses.

8. A method as claimed in claim 5, wherein the auxiliary light pulses have pulse durations gradually reduced until reach a predetermined constant value and thereafter maintain the predetermined constant value in the train of the auxiliary light pulses.

9. A method as claimed in claim 5, wherein a first occurring auxiliary recording light pulse has a longest duration and a last occurring auxiliary recording light pulse has a shortest duration in the train of the plurality of auxiliary recording light pulses.

10. A method as claimed in claim 5, wherein the plurality of auxiliary recording light pulses have pulse durations gradually reduced in the train of the plurality of auxiliary recording light pulses.

11. A method as claimed in claim 5, wherein the plurality of auxiliary recording light pulses have pulse duration gradually reduced until reach a predetermined constant value and thereafter maintain the predetermined constant value in the train of the plurality of auxiliary recording light pulses.

12. A method as claimed in claim 5, wherein the train of the auxiliary light pulses is the same in frequency as and smaller in peak power level than the train of the plurality of auxiliary recording light pulses.

13. A method of recording an information signal by using a single light beam on a recording medium which is changeable between two states which are optically distinguishable from each other, characterized by applying the single light beam in response to the information signal to the recording medium for a predetermined duration while changing the single light beam so as to have a higher energy at a beginning portion of the predetermined duration than an energy at an ending portion of the predetermined duration thereby causing the recording medium to melt uniformly at an area applied with the single light beam and causing a state change from one of the two states to the other to form a record mark having substantially a symmetrical shape;
wherein the single light beam applied for the predetermined duration consists of a train of a plurality of light pulses whose pulse widths reduce gradually from the beginning to the ending of the predetermined duration.

14. A method as claimed in claim 13, substantially satisfying the following condition:

$$Ts < 1.2 \times L/V$$

where Ts is an interval of the plurality of light pulses, L is a wavelength of a reading light beam used for reading the information signal recorded on the recording medium, and V is a relative speed between the recording medium and the reading light beam.

15. A method as claimed in claim 13, wherein the plurality of light pulses have a same pulse interval.

16. A method as claimed in claim 13, wherein the plurality of light pulses have a same peak power level.

17. A method of recording an information signal by using a single light beam on a recording medium which is changeable between two states which are optically distinguishable from each other, characterized by applying the single light beam in response to the information signal to the recording medium for a predetermined duration while changing the single light beam so as to have a higher energy at a beginning portion of the predetermined duration than an energy at an ending portion of the predetermined duration thereby causing the recording medium to melt uniformly at an area applied with the single light beam and causing a state change from one of the two states to the other to form a record mark having substantially a symmetrical shape;
wherein the single light beam applied for the predetermined duration consists of a train of a plurality of light pulses whose pulse intervals increase gradually from the beginning to the ending of the predetermined duration.

18. A method as claimed in claim 17, wherein the plurality of light pulses have a same pulse width.

19. A method as claimed in claim 17, wherein the plurality of light pulses have a same peak power level.

20. A method of recording an information signal by using a single light beam on a recording medium which is changeable between two states which are optically distinguishable from each other, characterized by applying the single light beam in response to the information signal to the recording medium for a predetermined duration while changing the single light beam so as to have a higher energy at a beginning portion of the predetermined duration than an energy at an ending portion of the predetermined duration thereby causing the recording medium to melt uniformly at an area applied with the light beam and causing a state change from one of the two states to the other to form a record mark having substantially a symmetrical shape;
wherein the single light beam applied for the predetermined duration consists of a train of a plurality of light pulses whose peak power levels decrease gradually from the beginning to the ending of the predetermined duration.

21. A method of recording an information signal by using a single light beam on a recording medium which is changeable between first and second states which are optically distinguishable from each other, comprising the steps of:
applying the single light beam, as a recording light pulse, in response to the information signal to the recording medium for a predetermined duration while modifying the single light beam into a train of auxiliary light pulses each having a shorter duration than the predetermined duration to cause the recording medium to melt and become the first state thereby forming a record mark having a substantially symmetric shape, a first occurring auxiliary light pulse in the train of the auxiliary light pulses having a longest duration among durations of the auxiliary light pulses in the train of the auxiliary light pulses; and applying the single light beam to an area of the recording medium before and after the single record mark while keeping the light beam a predetermined constant power level to cause the area to heat and become a state substantially identical to the second state.

22. A method as in claim 21, wherein the durations of the auxiliary light pulses decrease gradually in the order from the first occurring auxiliary light pulse in the train of the auxiliary light pulses until reach another predetermined duration.

23. A method of recording an information signal by using a single light beam on a recording medium which is reversibly changeable between two states which are optically distinguishable from each other, characterized by applying the light beam, as a recording light pulse, in response to the information signal to the recording medium for a predetermined duration while modulating the recording light pulse to have a higher energy at a beginning portion of the predetermined duration than an energy at an ending portion of the predetermined duration thereby causing the recording medium to melt uniformly at an area applied with the recording light pulse and cause a state change from one of the two states to the other to form a record mark having substantially a symmetrical shape, wherein the recording light pulse applied for the predetermined duration consists of a train of a plurality of light pulses among which a first occurring light pulse has a wider pulse width than a pulse width of a last occurring light pulse.

24. A method as claimed in claim 23, substantially satisfying the following condition:

$$Ts < 1.2 \times L/V$$

where Ts is an interval of the plurality of light pulses, L is a wavelength of a reading light beam used for reading the information signal recorded on the recording medium, and V is a relative speed between the recording medium and the reading light beam.

25. A method as claimed in claim 23, wherein the plurality of light pulses have a same pulse interval.

26. A method as claimed in claim 23, wherein the plurality of light pulses have a same peak power level.

27. A method of recording an information signal by using a single light beam on a recording medium which is reversibly changeable between two states which are optically distinguishable from each other, characterized by applying the single light beam, as a recording light pulse, in response to the information signal to the recording medium for a predetermined duration while modulating the recording light pulse to have a higher energy at a beginning portion of the predetermined duration than an energy at an ending portion of the predetermined duration thereby causing the recording medium to melt uniformly at an area applied with the recording light pulse and cause a state change from one of the two states to the other to form said area into a record mark having substantially a symmetrical shape, wherein the recording light pulse applied for the predetermined duration consists of a train of a plurality of light pulses occurring such that a first occurring pulse interval is shorter than a last occurring pulse interval in the predetermined duration.

28. A method as claimed in claim 27, wherein the plurality of light pulses have a same pulse width.

29. A method as claimed in claim 28, wherein the plurality of light pulses have a same peak power level.

30. A method of recording an information signal by using a single light beam on a recording medium which is reversibly changeable between two states which are optically distinguishable from each other, characterized by applying the single light beam, as a recording light pulse, in response to the information signal to the recording medium for a predetermined duration while modulating the recording light pulse to have a higher energy at a beginning portion of the predetermined duration than an energy at an ending portion of the predetermined duration thereby causing the recording medium to melt uniformly at an area applied with the recording light pulse and cause a state change from one of the two states to the other to form said area into a record mark having substantially a symmetrical shape, m wherein the recording light pulse applied for the predetermined duration consists of a train of a plurality of light pulses among which a first occurring light pulse has a higher peak power level than a peak power level of a last occurring light pulse.

* * * * *